(12) United States Patent
Kikuchi

(10) Patent No.: US 7,231,438 B1
(45) Date of Patent: Jun. 12, 2007

(54) DATA PROCESSING APPARATUS

(75) Inventor: Koji Kikuchi, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 724 days.

(21) Appl. No.: 09/675,002

(22) Filed: Sep. 29, 2000

(30) Foreign Application Priority Data

Oct. 4, 1999 (JP) ................................ 11-283430

(51) Int. Cl.
G06F 15/173 (2006.01)
(52) U.S. Cl. ...................... 709/224; 707/103; 709/223
(58) Field of Classification Search ................ 709/224, 709/223, 225; 707/103
See application file for complete search history.

(56) References Cited

U.S. PATENT DOCUMENTS 5,717,604 A * 2/1998 Wiggins ..................... 709/229
5,796,633 A * 8/1998 Burgess et al. ......... 364/551.01
6,101,500 A * 8/2000 Lau ............................ 707/103

* cited by examiner

Primary Examiner—Jason Cardone
Assistant Examiner—Adnan M. Mirza
(74) Attorney, Agent, or Firm—Fitzpatrick, Cella, Harper & Scinto

(57) ABSTRACT

There are provided a data processing apparatus, a data processing method, and a computer-readable recording medium, in which icons which enable the user to visually identify functions possessed by information processing devices on a network can be displayed on virtual system construction display screen. The data processing method has the steps of: discriminating the information processing device having a server function, storing information showing which server function the information processing device having a server function discriminated by the server function discriminating step has into server function type memory means, and when it is determined by the server function discriminating step that the information processing device has at least one server function, displaying such an information processing device onto the virtual system construction display screen by character information expressing such a function.

12 Claims, 11 Drawing Sheets

FIG. 4

| | | |
|---|---|---|
| MY PC | SCANNER SERVER FUNCTION | 401 |
| | FAX SERVER FUNCTION | 402 |
| | DESK TOP SERVER FUNCTION | 403 |
| | LICENSE SERVER FUNCTION | 404 |
| | ...... | |
| PC01 | SCANNER SERVER FUNCTION | |
| | FAX SERVER FUNCTION | |
| | DESK TOP SERVER FUNCTION | |
| | LICENSE SERVER FUNCTION | |
| | ...... | |
| PC02 | SCANNER SERVER FUNCTION | |
| | FAX SERVER FUNCTION | |
| | DESK TOP SERVER FUNCTION | |
| | LICENSE SERVER FUNCTION | |
| | ...... | |
| PC03 | SCANNER SERVER FUNCTION | |
| | FAX SERVER FUNCTION | |
| | DESK TOP SERVER FUNCTION | |
| | LICENSE SERVER FUNCTION | |
| | ...... | |
| PC04 | SCANNER SERVER FUNCTION | |
| | FAX SERVER FUNCTION | |
| | DESK TOP SERVER FUNCTION | |
| | LICENSE SERVER FUNCTION | |
| | ...... | |
| ...... | ...... | |

| PC | USER | START | TIME ELAPSED |
|---|---|---|---|
| PC00 | KIKUCHI | 1999/07/25 9:10 | 0:50 |
| PC01 | KAKIMOTO | 1999/07/25 8:30 | 1:30 |
| PC02 | MACHIDA | 1999/07/25 8:25 | 1:35 |
| PC03 | IIZUKA | 1999/07/25 9:24 | 0:36 |
| PC04 | KUROSIMA | 1999/07/25 9:00 | 1:00 |

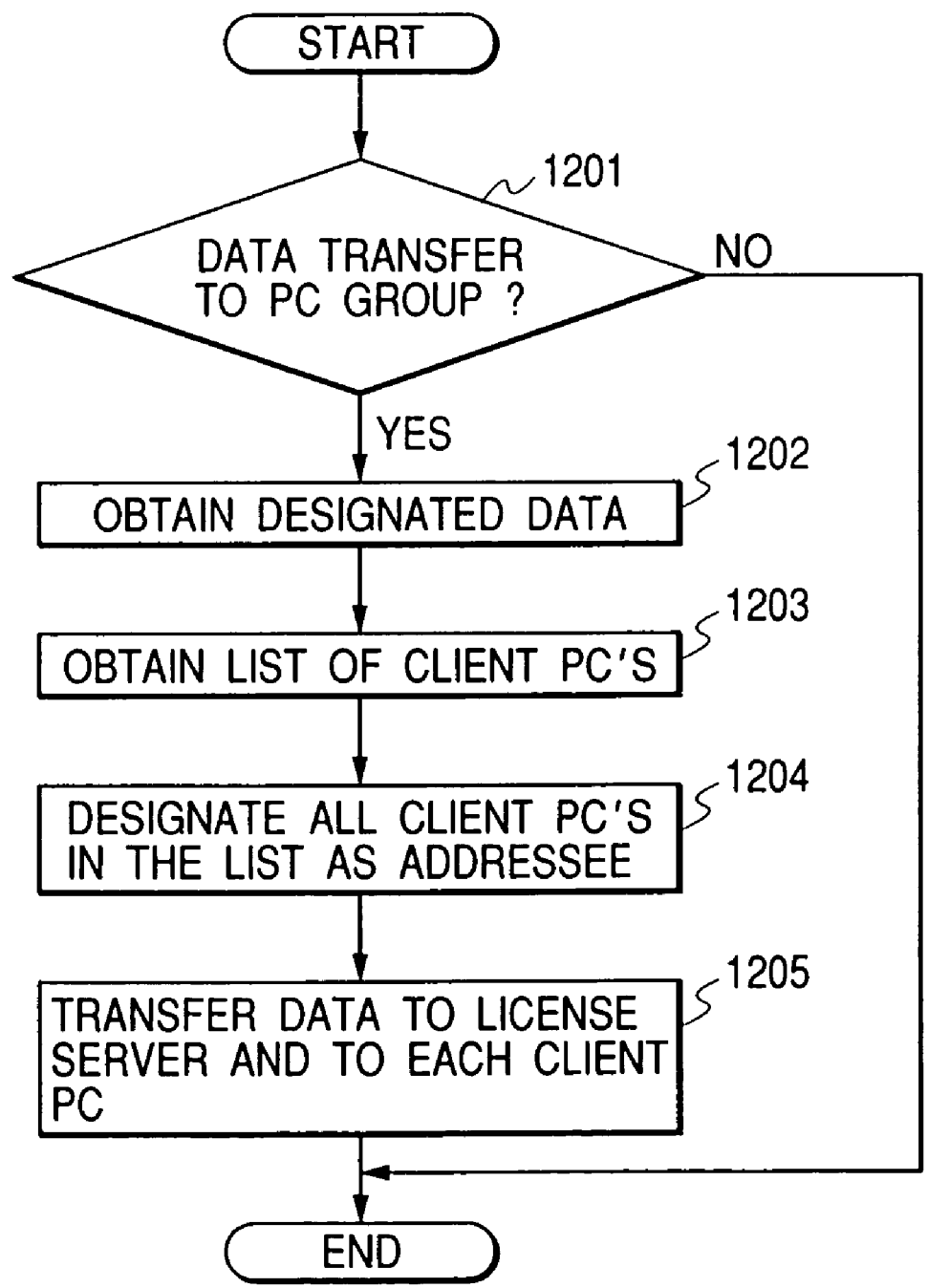

DATA PROCESSING APPARATUS

BACKGROUND OF THE INVENTION

1. Field of the Invention

The invention relates to a data processing apparatus which can communicate with various computers and various peripheral devices connected on a predetermined network and to a data processing method and a computer-readable recording medium.

2. Related Background Art

In recent years, in association with the rapid spread of computers (hereinafter, referred to as PCs) such as personal computers, workstations, and the like, various peripheral devices such as printer, scanner (image reading device or the like), digital camera, and the like as peripheral devices have rapidly been spread to individuals, offices, and the like. A network such as LAN or the like for mutually connecting them has also been spread. In association with it, for a long time, there have been many requests for a construction such that the printer, modem, scanner, and the like connected to the network are shared and used by a plurality of users on the networks.

For this purpose, in recent years, an environment which enables various apparatuses on the network as well as the peripheral devices such as printer, scanner, and the like to be shared and used by a plurality of users has widely been constructed in an office or the like.

Hitherto, the network environment as mentioned above has been expressed (virtual network display) on a screen of a PC (data processing apparatus) or the like. Various PCs and various peripheral devices (including peripheral devices locally connected to the PCs) are displayed as icons onto a line expressing the network, thereby realizing such a network environment. A display expressed (virtual network display) on the screen of the PC or the like as mentioned above is hereinbelow referred to as a virtual system construction display (screen). Various methods of forming the virtual system construction display (screen) were proposed in the past and their descriptions are omitted in the present specification.

In the conventional virtual system construction display screen such that the network environment has been expressed on the screen of the PC or the like, by referring to the displays (icons) of the various PCs and various peripheral devices connected to the network, identification of the device expressed by each icon (identification showing whether the device is a printer, a scanner, a PC, or the like), a function such as data input, output, or the like of each icon (device), and its status information can be obtained from a shape or the like of the icon.

In the conventional virtual system construction display screen, however, for example, although functions of the PC of the user himself are displayed with respect to the display regarding the PC, as for the other PCs, functions of any of the PCs are not displayed. When the PC having the function which is desired by the user is searched on the network, such a PC cannot be visually identified and the target PC cannot be easily discriminated. Also in case of distributing data to a predetermined group in the PCs, since the PCs belonging to the same group cannot be easily visually identified, the user needs to confirm a distribution destination by another method. Such an operation becomes a load (burden) when the user uses a data distributing function.

As mentioned above, in the conventional data processing apparatus, there is a problem such that when the user searches a PC having a desired function on the virtual system construction display screen, such a PC cannot be visually identified and the target PC cannot be easily discriminated.

Since the PCs belonging to the same group cannot be easily visually identified on the virtual system construction display screen, the user needs to confirm the distribution destination by another method. There is a problem such that such an operation becomes a burden when the user uses the data distributing function.

SUMMARY OF THE INVENTION

The invention is made in consideration of the problems and it is the first object of the invention to provide a data processing apparatus, a data processing method, and a computer-readable recording medium, in which icons by which the user can visually identify functions possessed by each PC can be displayed on a virtual system construction display screen.

It is the second object of the invention to provide a data processing apparatus, a data processing method, and a computer-readable recording medium, in which icons by which the user can visually identify a group of PCs can be displayed on a virtual system construction display screen when each PC is displayed.

To accomplish the objects, according to one aspect of the invention, there is provided a data processing apparatus which can communicate data through a predetermined network to each of various information processing devices and various peripheral devices connected to the predetermined network, wherein the information processing device having a server function among the information processing devices is displayed on a virtual system construction display screen by character information expressed by reflecting a fact that the device has the server function.

According to the invention, in the information processing devices having the server function and the information processing devices having the sharing server function, each of the character information of the information processing devices having the server function for managing the licenses is displayed by character information of a shape which is different from those of ordinary information processing devices. Therefore, the user can easily visually identify the information processing devices having the server function and, further, the server function for managing the licenses.

Since a group client constructed by the information processing devices having the server function for managing each license and the client side information processing devices using the license is clarified, the information processing devices which form the group to which the self PC belongs and have the server function for managing the licenses and the client side information processing devices can be easily visually discriminated.

The above and other objects and features of the present invention will become apparent from the following detailed description and the appended claims with reference to the accompanying drawings.

BRIEF DESCRIPTION OF THE DRAWINGS

FIG. 4 is a diagram showing an example of a management information table in each PC having a server function in the embodiment;

FIG. 12 is a flowchart showing the control operation of a program for performing a distributing process of transfer data in a lump.

DETAILED DESCRIPTION OF THE PREFERRED EMBODIMENTS

Embodiments of the invention will now be described hereinbelow in detail with reference to the drawings.

Figure 1:
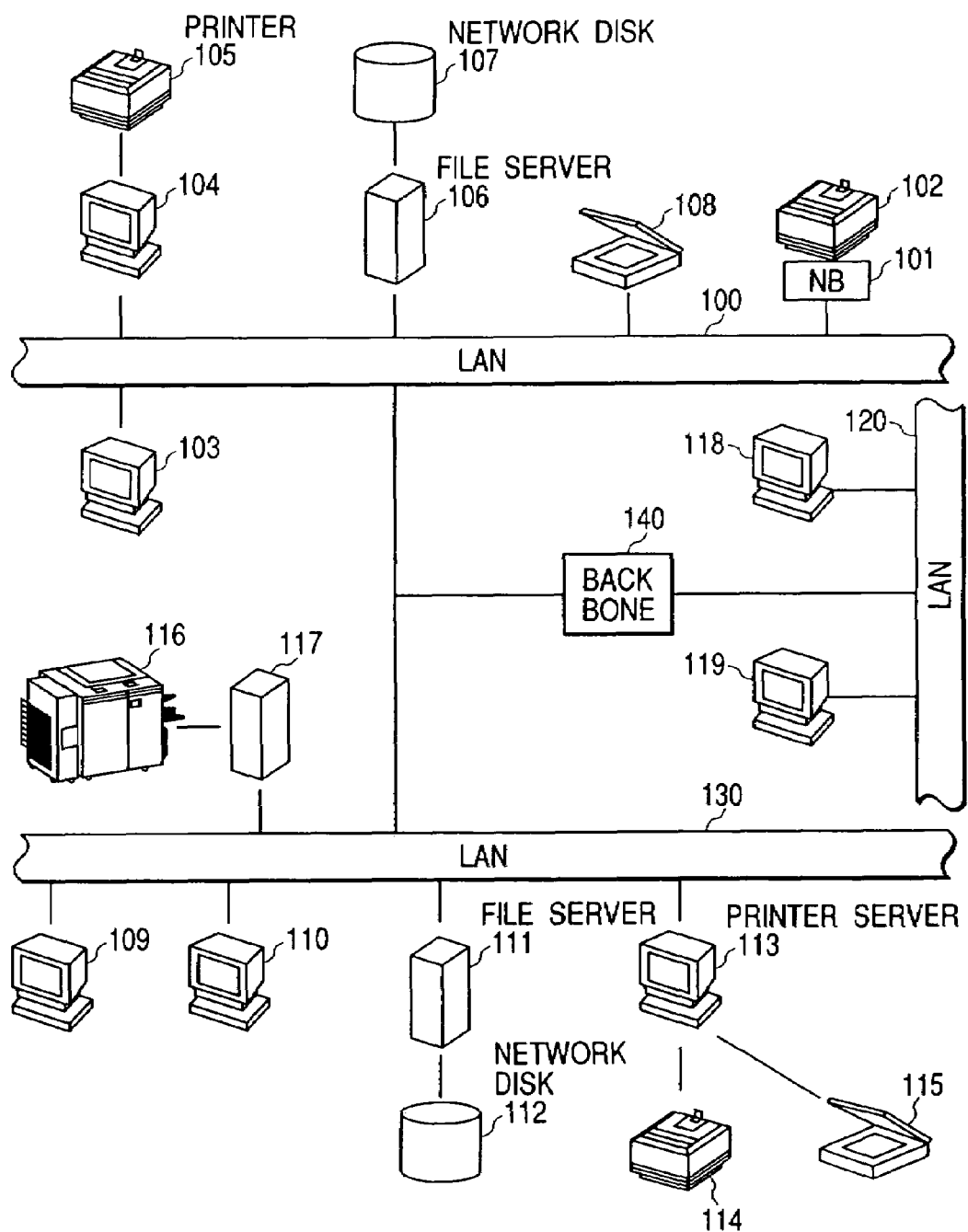
FIG. 1 is a diagram showing a system construction example of network devices including data processing apparatuses in the invention.

FIG. 1 is a diagram showing a system construction example of network devices including data processing apparatuses in the invention.

As shown in FIG. 1, the system of the network devices including data processing apparatuses (PCs and the like), various information processing devices (PCs and the like), and various peripheral devices is constructed by a WAN as a set of LANs which are formed by connecting several Local Area Networks (hereinafter, also referred to as LANs) by a high speed digital line such as an Integrated Services Digital Network (ISDN) or the like. In FIG. 1, an LAN 100, an LAN 130, and an LAN 120 are connected by a back bone 140, thereby forming the WAN. Thus, each data processing apparatus and various information processing devices connected to the LANs 100, 120, and 130 can mutually access to functions of the other devices connected to the LANs other than the LAN to which the self PC is directly connected through the WAN. Such a WAN connection is also simply referred to as a network hereinbelow.

A printer 102 in FIG. 1 is a printer having an open type architecture and connected to the network via a network board (NB) 101. The NB 101 is connected to the LAN 100 via an Ethernet interface 10Base-2 having a coaxial connector, a local area network interface of 10Base-T having RJ-45, or the like.

A plurality of personal computers (PCs) such as PC 103, PC 104, PC 109, PC 110, PC 118, PC 119, and the like are connected to the LANs 100, 120, and 130, respectively. Those PCs can communicate with the NB 101 under the control of a network operating system. In the embodiment, therefore, one of the PCs, for example, the PC 103 is used as a PC for managing the network devices.

A printer 105 is locally connected as a local printer to the PC 104 connected to the LAN 100. The PC 104 functioning as a printer server manages the printing to the printer 105 locally connected, the printer 102 locating at a remote place, or the like. Similarly, a PC 113 which functions as a printer server and is connected to the LAN 130 manages the printing to a printer such as printer 114 locally connected, printer 102 locating at a remote place, or the like.

A PC 106 which is connected to the LAN 100 and functions as a file server manages an access to a file stored in a network disk 107 of a large capacity. Similarly, a PC 111 which is connected to the LAN 130 and functions as a file server manages an access to a file stored in a network disk 112 of a large capacity.

Further, the PC 113 is made to function as a scanner server and a scanner such as scanner 115 locally connected, scanner 108 locating at a remote place, or the like is managed. The scanner 108 is connected to the LAN 100 through a network board (not shown). A digital copying apparatus 116 provides functions as a printer and a scanner under a management control of an image processing unit 117 connected to the LAN 130.

In the network shown in FIG. 1, network software such as Novell, UNIX, or the like is used to efficiently communicate between various network members.

Each of the PC 103 and PC 104 is a general PC which can perform a formation of data files, a transmission of the formed data files to the LAN 100 or a reception of files from the LAN 100, and further, a display and/or a process of those files.

Further, although the personal computers (PCs) are shown as terminal apparatuses in FIG. 1, other computer apparatuses suitable to execute the network software can be also used. For example, in case of using the software of UNIX, UNIX workstations can be also connected to the network and those workstations can be used in a state where they exist mixedly with the PCs shown in the diagram.

Ordinarily, the LAN 100 provides services of, for example, user groups of one or a plurality of continuous floors in one building to a relatively local user group. A wide area network (WAN) is constructed ordinarily in accordance with a situation that the users are away from each other as in the case where the users are located in different buildings, at remote places, or the like.

Figure 2:
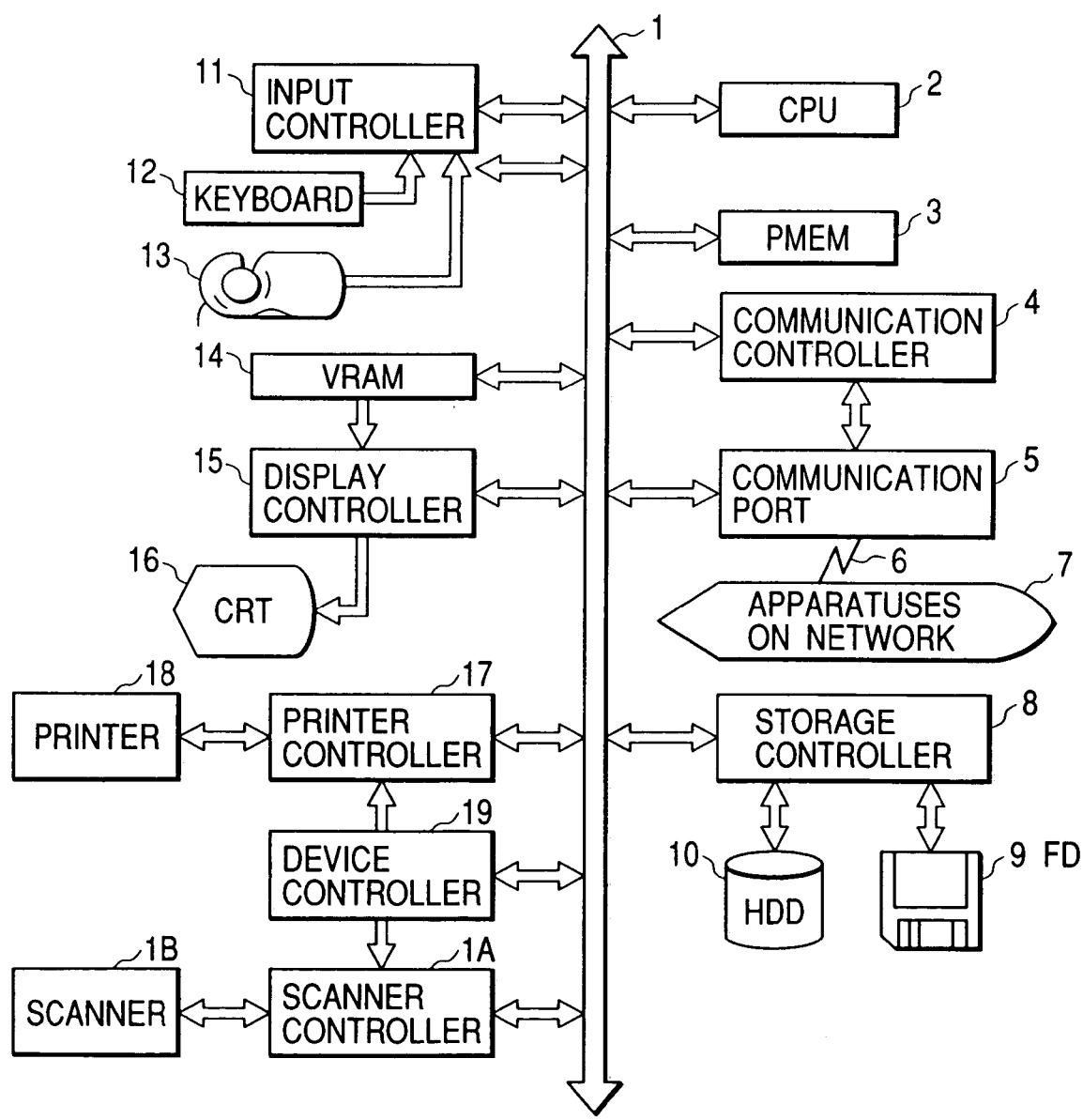
FIG. 2 is a block diagram showing a construction of the data processing apparatus of the invention.

FIG. 2 is a block diagram showing a construction of the data processing apparatus of the invention.

The data processing apparatus as shown in FIG. 2 can communicate by a predetermined protocol with the other data processing apparatuses in which predetermined peripheral devices (including a printer, a scanner, a modem, a hybrid image processing apparatus, and the like) are locally connected through an LAN such as Ethernet or the like as a communication medium (not shown).

In FIG. 2, reference numeral 1 denotes a system bus. Each unit, which will be explained hereinbelow, is connected to the system bus 1. Reference numeral 2 denotes a CPU (Central Processing Unit); and 3 indicates a program memory (PMEM). A program for the present process is properly selected/read out from a hard disk 10 into the PMEM 3 and executed by the CPU 2. Data inputted from a keyboard 12 is stored as code information in the PMEM 3 also serving as a text memory.

Reference numeral 4 denotes a communication controller for controlling data that is inputted or outputted through a communication port 5. A signal outputted from the communication port 5 is transferred to a communication port of another apparatus 7 on the network through a communication line 6. Data transmission and reception to/from a printer or an image reading device (scanner) which is shared on the network are executed via the communication controller 4. Although the LAN or the like will be explained as a network as an example in the embodiment, the invention can be applied even to an ordinary public line as a communication port and a communication line which are connected to the communication controller 4.

Reference numeral 8 denotes a storage controller for controlling an access to a disk for data files, for example, to a floppy disk (hereinafter, also referred to as an FD) 9 or the hard disk (hereinafter, also referred to as an HDD) 10. Reference numeral 11 denotes an input controller to which input devices such as keyboard 12, mouse 13, and the like are connected. The user issues an operation command or the like of the system by operating the keyboard 12 or mouse 13.

Reference numeral 16 denotes a CRT apparatus (CRT). A pointing device (hereinafter, also referred to as a PD) is used for instructing for modification of image information (window or the like) on the CRT 16 and the mouse 13 is used in the embodiment. By using the mouse 13, a cursor on the CRT 16 is arbitrarily moved in the X and Y directions, a command icon on a command menu is selected, a process is instructed, or the like. In this manner, an edition target, a drawing position, or the like is instructed.

Reference numeral 14 denotes a video image memory (hereinafter, also referred to as a VRAM). Drawing data (bit map data) to be displayed on the CRT 16 is developed in the VRAM 14, properly read out through a display controller 15, and its contents are displayed on the CRT 16. Reference numeral 17 denotes a printer controller for controlling an output of data to a connected printer 18. Reference numeral 1A denotes a scanner controller for performing an image reading control of a connected image reading device (scanner) 1B. A device controller 19 controls the printer controller 17 or scanner controller 1A, thereby controlling the operation of a printer, a scanner, or the like provided for the other apparatus 7 as an external device on the network.

With respect to the data processing apparatus (image reading server apparatus) according to the server side construction of the invention, the component elements of the scanner controller 1A and scanner 1B are indispensable. However, in the client side apparatus (other data processing apparatus or the like), the same component element shared on the server side can be used through the communication controller 4 and communication port 5 as mentioned above.

In the construction of FIG. 2, in the case where the image reading device and the image reading server apparatus are physically different components, it is assumed that the image reading server apparatus has a function similar to one component including the image reading device.

In the embodiment, a plurality of relevant processing programs stored in the ROM (PMEM 3) can be overlappingly stored in the storage media such as HDD 10, FD 9, and the like connected directly to the data processing apparatus, other apparatuses constructed (connected) by the network, and the like.

Further, the processing program of the invention can be supplied to the storage medium such as HDD 10, FD 9, or the like or to another system or apparatus through the network.

First Embodiment

Processes for displaying the PC having the server function by an icon having a shape which means that the PC has the server function when each PC is displayed by an icon will be described hereinbelow.

Figure 3:
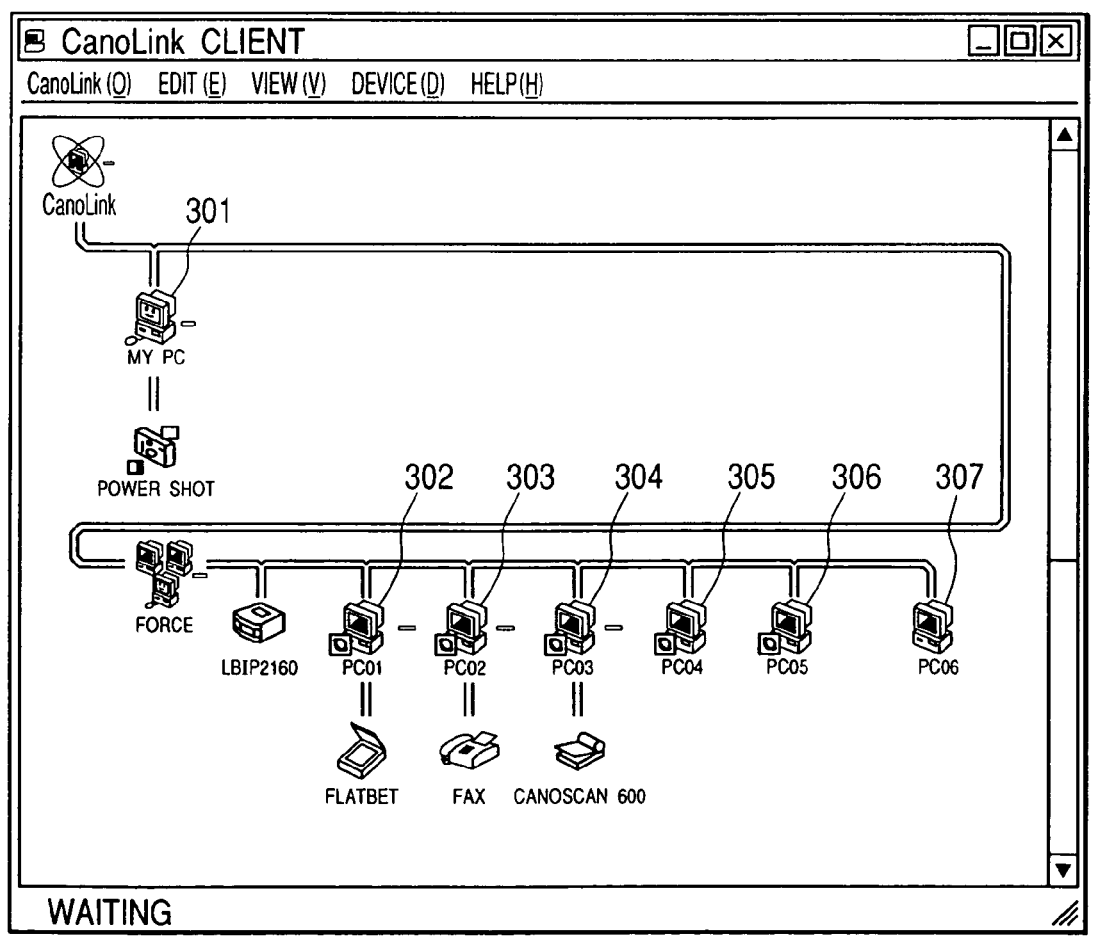
FIG. 3 is a diagram showing an example of a virtual system construction display screen of a network system which is displayed on a CRT shown in FIG. 2 and constructed by various PCs and various peripheral devices.

FIG. 3 is a diagram showing an example of a virtual system construction display screen of a network system which is displayed on the CRT 16 shown in FIG. 2 and constructed by various PCs and various peripheral devices.

As shown in FIG. 3, in the embodiment, an icon shape of each PC and each peripheral device existing on the network is allowed to have a feature and displayed so that each PC and each peripheral device can be easily visually recognized.

An icon 301 denotes an icon showing the self PC. Icons 302 and 304 denote servers having the sharing server function of a scanner and each PC icon to which a mark (green square mark shown at the lower left position of the icon) indicative of such a function (server function) has been added is displayed. An icon 303 denotes a server similarly having the sharing server function of a facsimile apparatus and an icon to which a mark indicative of such a function has been added is displayed.

An icon 305 denotes a server having a server function (not the sharing server function) for providing a screen image of a machine instead of the peripheral device. Also in this case, a PC icon having the server function is displayed. An icon 306 is a PC having a server function (not the sharing server function) for managing the licenses in order to control the number of valid clients. Similarly, a PC icon having the server function is displayed. Since an icon 307 is a PC which particularly does not have the server function, an ordinary PC icon is displayed.

FIG. 4 is a diagram showing an example of a management information table in each PC having the server function in the embodiment. This management information table is stored in, for example, an open area of the PMEM 3 (server function type memory means).

The management information table in FIG. 4 is FIG. 4 provided for discriminating whether each PC to be displayed on the virtual system construction display screen in FIG. 3 is displayed as a PC icon having the server function or not. For example, it is formed or updated when the network is activated or a network construction is changed.

The management information table has: an area 401 for storing information showing whether each PC has a scanner server function for providing, for example, a scanner as a sharing device or not every PC; an area 402 for storing information showing whether each PC has a facsimile (FAX) server function for providing an FAX modem or an FAX board as a sharing device or not; an area 403 for storing information showing whether each PC has a server function for opening an image of a desk-top screen or not; and an area 404 for storing information showing whether each PC has a license server function for controlling the number of valid clients (the accesses of the user are managed) or not.

The CPU 2 in FIG. 2 discriminates whether each PC has some server function or not with reference to the management information table every PC. If it is determined that the PC has at least one of the server functions, the PC is displayed as a PC icon having the server function onto the virtual system construction display screen in FIG. 3.

Figure 5:
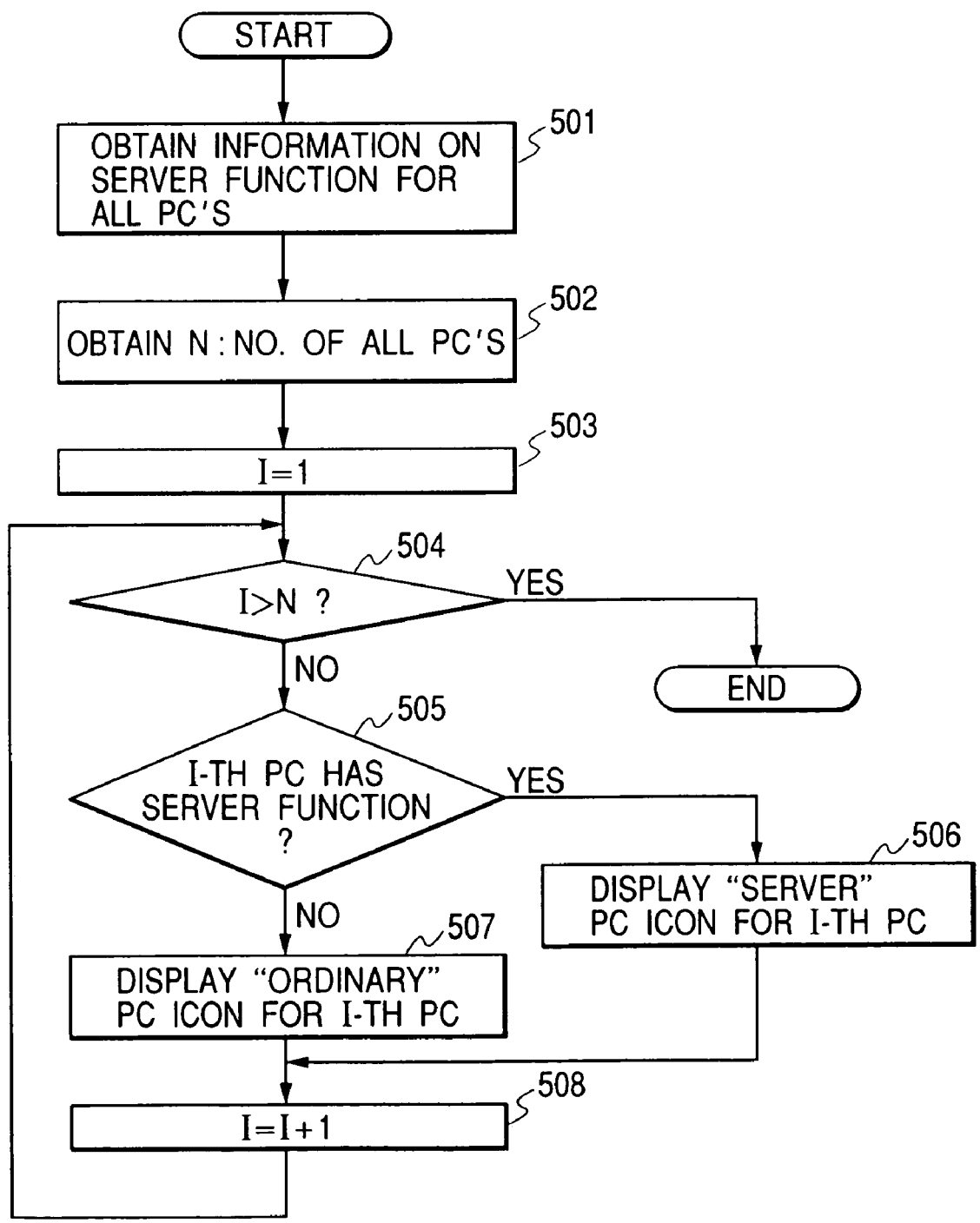
FIG. 5 is a flowchart showing the control operation of a program for performing a display control of the PC having the server function in the embodiment.

The operation for displaying the PC having the server function in the embodiment onto the virtual system construction display screen will now be described with reference to a flowchart of FIG. 5. FIG. 5 is the flowchart showing the control operation of a program for performing a display control of the PC having the server function in the embodiment.

As for this program, the program stored in the HDD 10 or FD 9 shown in FIG. 2 or in another storage medium (not shown) is read out and stored in the PMEM 3 and the CPU 2 executes the program on the basis of the read-out program.

First, the data processing apparatus (for example, PC 301 in FIG. 3) obtains information showing whether the relevant PC has some server function or not with respect to all of the PCs existing on the LAN 100 including the self PC (step 501). Such information is obtained by, for example, referring to the management information table in FIG. 4.

The number N of all PCs is subsequently obtained from the information of the PCs obtained in step 501 (step 502). A counter variable I is initialized to "1" (step 503).

Subsequently, in step 504, a count value of the counter I is compared with the number N of PCs and, when I and N are equal or when I is smaller than N (when I is not larger than N), step 505 follows. In the opposite case, the processing routine is finished (step 504).

In step 505, whether the I-th PC has some server function shown in FIG. 4 or not is discriminated. If it is determined that the I-th PC has some server function, this PC is displayed as a PC icon having the server function as shown in FIG. 3 onto the virtual system construction display screen displayed on the CRT 16 in FIG. 2 in step 506. Step 508 follows.

If it is determined in step 505 that the I-th PC has no server function, step 507 follows. This PC is displayed as an ordinary PC icon as shown in FIG. 3 onto the virtual system construction display screen displayed on the CRT 16 in FIG. 2. Step 508 follows. The above discriminating process is merely shown as an example. The number of kinds of discrimination can be increased and the invention is not limited to those examples.

When the discrimination (icon display) regarding the I-th PC is finished by the above process, the count value of the counter I is increased by "1" in order to set the next PC to a target of the discrimination. The processing routine is returned to step 504 (step 508). If I>N in step 504 and the processes regarding the discrimination of all of the PCs are finished, the processing routine is finished.

By the above processes, whether each PC has some server function or not is discriminated and when it is determined that each PC has some server function, an icon is displayed on the virtual system construction display screen displayed on the CRT 16 in FIG. 2 as a PC icon which has the server function as shown in FIG. 3 and can be easily visually discriminated by the user, so that the operability can be improved.

Second Embodiment

The above first embodiment is characterized in that the icon of the PC having the server function is displayed by the icon which indicates the PC having the server function and has a shape different from that of the ordinary PC icon, thereby enabling the user to easily visually identify the PC having the server function.

According to the second embodiment, among the kinds of sharing servers, only the PCs having the license server function are displayed by the other icons, thereby enabling the user to easily visually discriminate a license server group forming a predetermined group. Explanation will now be made hereinbelow with reference to the drawings. In the following explanation, it is assumed that a construction of the PC (data processing apparatus) is similar to that of FIG. 2 and a construction of the network is also similar to that of FIG. 3.

Figures 6, 7:
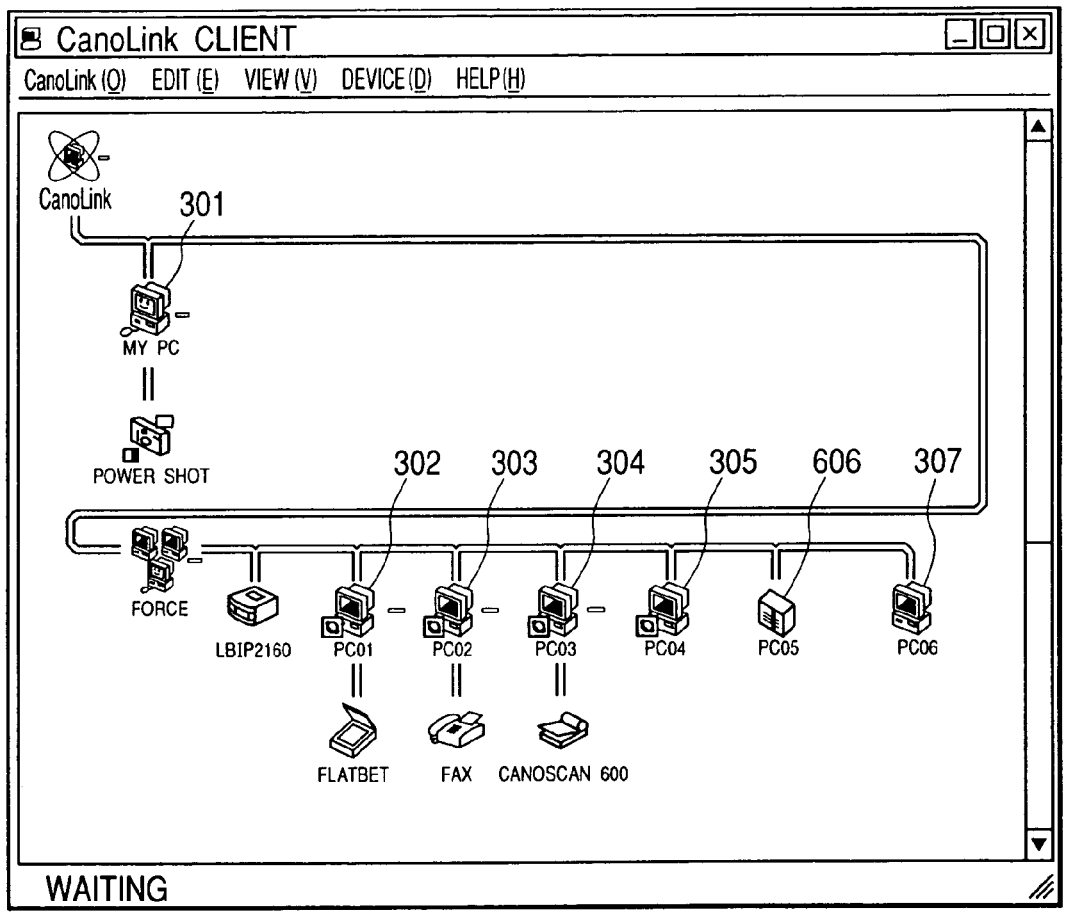
FIG. 6 is a diagram showing an example of a virtual system construction display screen of a network system which is displayed on the CRT shown in FIG. 2 and constructed by various PCs and various peripheral devices in the second embodiment.
FIG. 7 is a diagram showing an example of a client management information table in which management information of each client in the PC having the server function for managing the licenses has been stored according to the embodiment.

FIG. 6 is a diagram showing an example of a virtual system construction display screen of a network system which is displayed on the CRT 16 shown in FIG. 2 and constructed by the various PCs and various peripheral devices in the second embodiment.

The icon 306 in FIG. 3 is the PC having the server function as mentioned in the description of FIG. 3. However, since the server function possessed by the PC shown by the icon 306 relates to the license management, in the embodiment, as shown in FIG. 6, the icon 306 (PC having the license server function) in FIG. 3 is displayed by an icon 606 having a different shape.

Whether the PC has the server function of the license management or not is discriminated by using the information stored in the area 404 in the management information table shown in FIG. 4.

FIG. 7 is a diagram showing an example of a client management information table in which management information of each client in the PC having the server function for managing the licenses has been stored according to the embodiment.

A PC name, a user name, a use start time, a use elapsed time, and the like as information of a client using his own license have been stored in the client management information table in FIG. 7. "MY. PC" shown by the icon 301 in FIG. 6 corresponds to the PC name "PC00" in FIG. 7. From this table of FIG. 7, for example, it will be understood that Mr. KIKUCHI as a user of this PC uses the PC having the server function for managing the licenses shown by the icon 606 for 50 minutes from 9:10, on Jul. 25, 1999.

Figure 8:
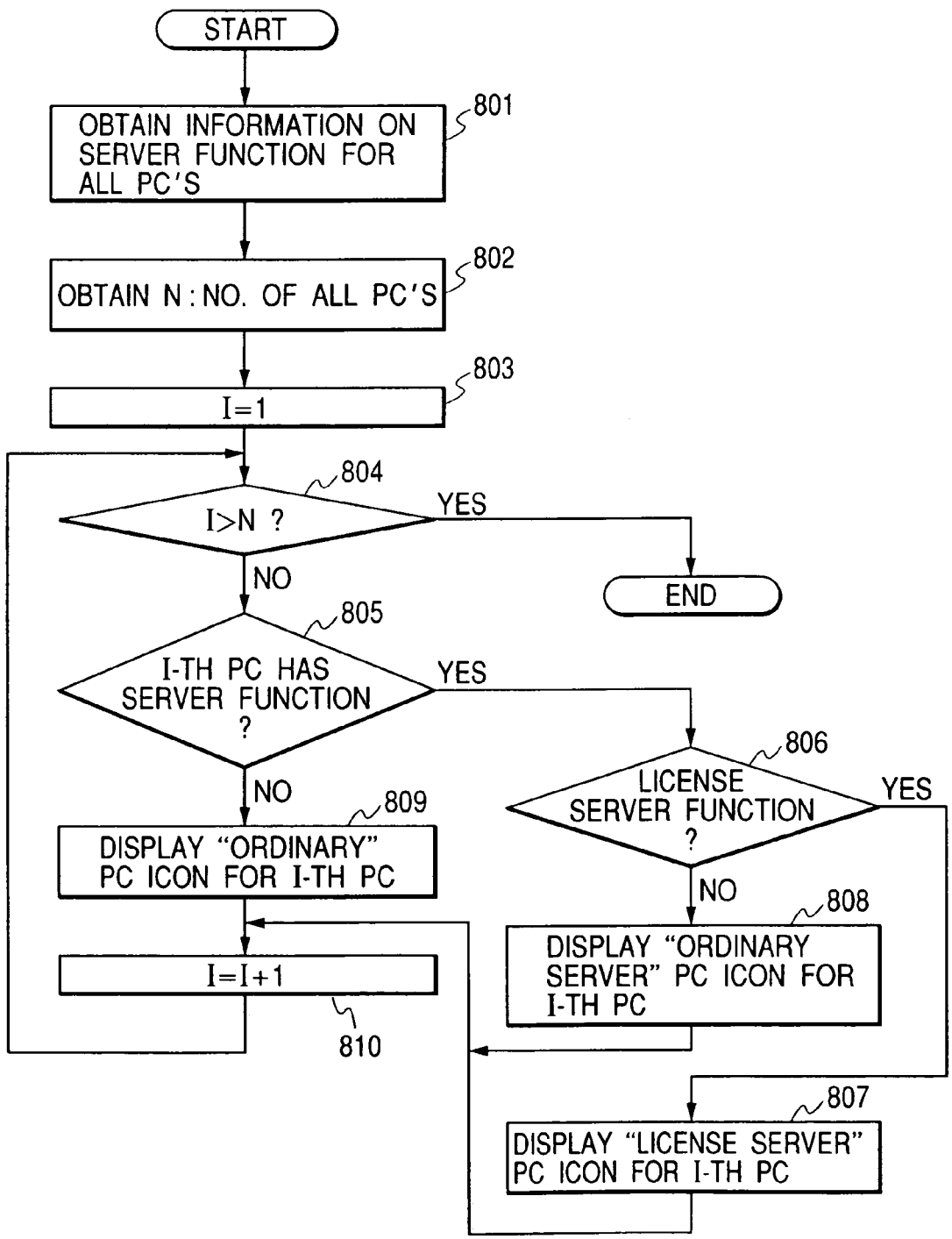
FIG. 8 is a flowchart showing the control operation of a program for performing a display control of the PC having the license server function in the embodiment.

The operation for displaying only the PCs having the license server function among the kinds of sharing servers in the embodiment by the other icons will now be described with reference to a flowchart of FIG. 8. FIG. 8 is the flowchart showing the control operation of a program for performing a display control of the PC having the license server function in the embodiment.

As for this program, the program stored in the HDD 10 or FD 9 shown in FIG. 2 or in another storage medium (not shown) is read out and stored in the PMEM 3 and the CPU 2 executes the program on the basis of the read-out program.

First, the data processing apparatus (for example, PC 301 in FIG. 3) obtains information showing whether the relevant PC has some server function or not with respect to all of the PCs existing on the LAN 100 including the self PC (step 801). Such information is obtained by, for example, referring to the management information table in FIG. 4.

The number N of all PCs is subsequently obtained from the information of the PCs obtained in step 801 (step 802). A counter variable I is initialized to "1" (step 803).

Subsequently, in step 804, a count value of the counter I is compared with the number N of PCs and, when I and N are equal or when I is smaller than N (when I is not larger than N), step 805 follows. In the opposite case, the processing routine is finished.

In step 805, whether the I-th PC has some server function shown in FIG. 4 or not is discriminated. If it is determined that the I-th PC has some server function, whether the I-th PC has the server function for managing the licenses or not is discriminated in step 806. If it is decided that the I-th PC has the server function for managing the licenses, a PC icon of a predetermined shape having the server function for managing the licenses is displayed on the virtual system construction display screen displayed on the CRT 16 in step 807. Step 810 follows.

If it is determined in step 806 that the I-th PC does not have the server function for managing the licenses, this PC is displayed as a PC icon having the ordinary server function as shown in FIG. 3 onto the virtual system construction display screen displayed on the CRT 16 in step 808. Step 810 follows.

If it is determined in step 805 that the I-th PC has no server function, step 809 follows. The relevant PC is displayed as an ordinary PC icon as shown in FIG. 3 onto the virtual system construction display screen displayed on the CRT 16. Step 810 follows. The above discriminating process is merely shown as an example. The number of kinds of discrimination can be increased and the invention is not limited to those examples.

When the discrimination (icon display) regarding the I-th PC is finished by the above process, the count value of the counter I is increased by "1" in order to set the next PC to a target of the discrimination. The processing routine is returned to step 804 (step 810). If I>N in step 804 and the processes regarding the discrimination of all of the PCs are finished, the processing routine is finished.

By the above processes, whether the PC has the server function for managing the licenses or not is further discriminated as for the first embodiment. When it is determined that the PC has the server function for managing the licenses, this PC is displayed by a PC icon of a predetermined shape having the server function for performing the license management, thereby enabling the user to easily visually identify the server PC which the user wants to get the license, so that the operability can be improved.

Third Embodiment

The above first and second embodiments are characterized in that among the PCs having the server function and the PCs having the sharing server function, the icon of the PC having the server function for managing the licenses is displayed by the PC icon having a shape different from that of the ordinary PC, thereby enabling the user to easily visually identify the PC having the server function and, further, the PC having the server function for managing the licenses.

According to the third embodiment, each license management server and the group client constructed by clients using the license (also referred to as licensed clients) are clarified, thereby enabling the user to virtually and easily discriminate the license servers forming the group to which the self PC belongs and their clients. Explanation will now be made hereinbelow with reference to the drawings. The above processes are also similarly executed in the case where the self PC has the server function for managing the licenses. Explanation will now be made together with such an example.

Figure 9:
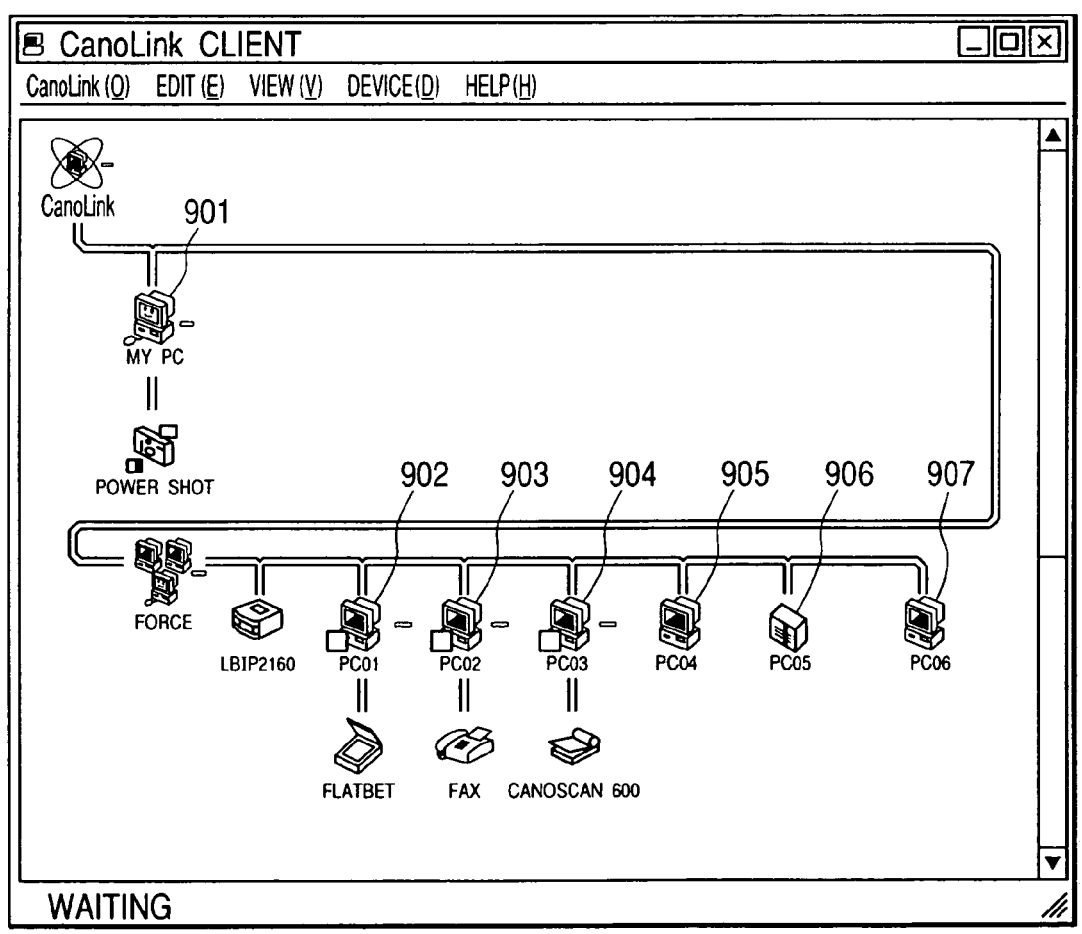
FIG. 9 is a diagram showing an example of a virtual system construction display screen of a network system which is displayed on the CRT shown in FIG. 2 and constructed by various PCs and various peripheral devices in the third embodiment.

FIG. 9 is a diagram showing an example of a virtual system construction display screen of a network system which is displayed on the CRT 16 shown in FIG. 2 and constructed by various PCs and various peripheral devices in the third embodiment.

In FIG. 9, an icon 901 denotes a self PC and an icon 906 indicates a PC having the server function for managing the licenses used by the self icon 901. Icons 902, 903, and 904 similarly denote PCs which obtained the licenses from the icon 906 indicative of the PC having the server function for managing the licenses and a square mark showing it is displayed at the lower left position of the icon.

Those displays, namely, the displays of the other client PCs belonging to the PC having the server function for managing the licenses to which the self PC belongs can be realized by a method whereby the client PCs are recognized by the following procedure.

First, the PCs having the server function for managing the licenses are listed from the management information table shown in FIG. 4. Further, from the listed PCs having the server function for managing the licenses, the PC having the server function for managing the licenses to which the self PC belongs is detected. This method is not particularly limited but the PC which obtains the license can be also stored in the self PC.

The list information of the licensed client PCs which has obtained the license at present is obtained from the client management information table shown in FIG. 7 possessed by the PC having the server function for managing the licenses to which the self PC belongs. By using this information, the other client PCs belonging to the PC having the server function for managing the licenses to which the self PC belongs are recognized. The other client PCs belonging to the PC having the server function for managing the licenses to which the self PC belongs are displayed.

Consequently, the client PCs constructing a group in which the PC having the server function for managing the licenses to which the self PC belongs becomes a mediator can be grasped. As mentioned above, each of the client PCs belonging to this group is displayed by a special icon which means that it belongs to such a group.

Figure 10:
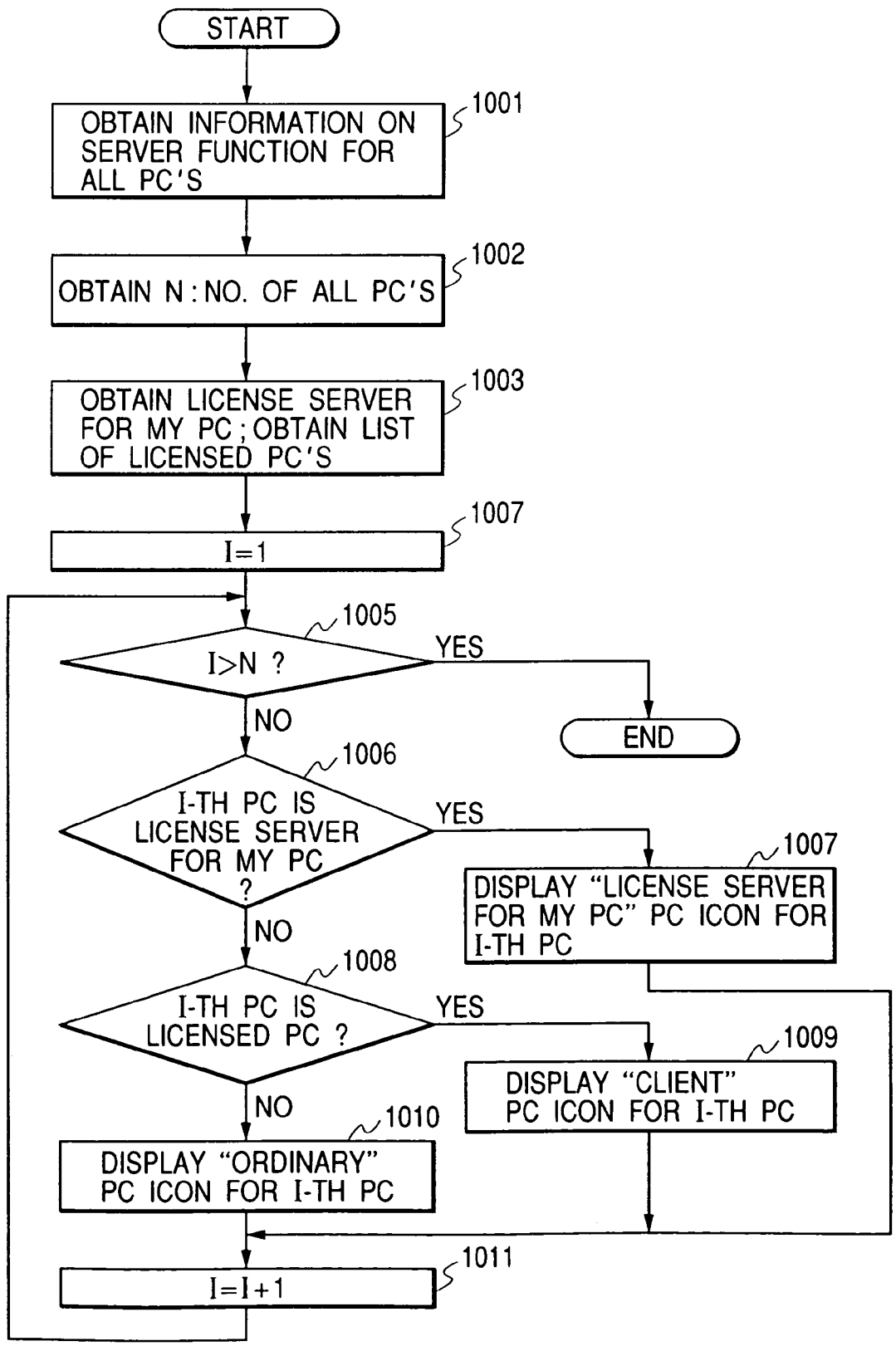
FIG. 10 is a flowchart showing the control operation of a program for performing a display control of client PCs belonging to a group to which a self PC belongs.

The operation for displaying the client PCs constructing a group in which the PC having the server function for managing the licenses to which the self PC belongs becomes a mediator will now be described with reference to a flowchart of FIG. 10. FIG. 10 is the flowchart showing the control operation of a program for performing a display control of the client PCs belonging to the group to which the self PC belongs.

As for this program, the program stored in the HDD 10 or FD 9 shown in FIG. 2 or in another storage medium (not shown) is read out and stored in the PMEM 3 and the CPU 2 executes the program on the basis of the read-out program.

First, the data processing apparatus (for example, PC 301 in FIG. 3) obtains information showing whether the relevant PC has some server function or not with respect to all of the PCs existing on the LAN 100 including the self PC (step 1001). Such information is obtained by, for example, referring to the management information table in FIG. 4.

The number N of all PCs is subsequently obtained from the information of the PCs obtained in step 1001 (step 1002). A license management server (PC having the server function for managing the licenses) which manages the licenses and is used by the self PC is obtained and a list of the client PCs which use the licenses at present (also referred to as licensed client PCs) is obtained from the server (step 1003). The counter variable I is initialized to "1" (step 1004).

Subsequently, in step 1005, a count value of the counter I is compared with the number N of PCs and, when I and N are equal or when I is smaller than N (when I is not larger than N), step 1006 follows. In the opposite case, the processing routine is finished.

In step 1006, whether the I-th PC is the license management server used by the self PC or not is discriminated. If it is determined that the I-th PC is the license management server used by the self PC, a PC icon of a predetermined shape indicative of the license management server used by the self PC is displayed on the virtual system construction display screen displayed on the CRT 16 in step 1007. Step 1011 follows.

If it is determined in step 1006 that the I-th PC is not the license management server used by the self PC, whether the I-th PC is a PC belonging to the list of the client PCs or not is discriminated in step 1008 with reference to the list of the client PCs obtained in step 1003. If it is determined that the I-th PC is the PC belonging to the list of the client PCs, a PC icon of a predetermined shape showing that the I-th PC is the client PC is displayed on the virtual system construction display screen displayed on the CRT 16 in step 1009. Step 1011 follows.

If it is determined in step 1008 that the I-th PC is not the PC belonging to the list of the client PCs, a PC icon of a shape showing that it is the ordinary PC is displayed on the virtual system construction display screen displayed on the CRT 16 in step 1010. Step 1011 follows.

When the discrimination (icon display) regarding the I-th PC is finished by the above process, the count value of the counter I is increased by "1" in order to set the next PC to a target of the discrimination. The processing routine is returned to step 1005 (step 1011). If I>N in step 1005 and the processes regarding the discrimination of all of the PCs are finished, the processing routine is finished.

In the embodiment, a mixing process with respect to the PCs which denote the server function shown in the first and second embodiments is not described in order to enhance the meaning of the group. However, a mixed display is also possible. The display mode can be separately displayed by dividing it into a server function mode and a group function mode. It is also possible to give priorities and to, for example, preferentially display the information regarding the group. Both information can be also displayed by using a method of adding them to the icon display. The display method is not particularly limited to them here.

By the above processes, if the embodiment is used, the user can identify the license management server PC to which the self PC belongs and the licensed client PCs. Therefore, by displaying those PCs by the icons showing their meanings, the group which is managed by the license management server (PC having the server function for managing the licenses) can be easily visually identified. Further, since the number of licenses which are used can be easily visually grasped, the efficiency of management can be raised.

Fourth Embodiment

The third embodiment is characterized in that a set group of PCs comprising the license management server PC which is used by the self PC and the licensed client PCs can be easily visually grasped.

According to the fourth embodiment, when a distributing process is further executed to the set group, merely by dropping desired distribution data onto the icon of the license management server PC, the data can be distributed to the whole group without particularly executing a process such as a destination designation or the like. Those processes are also similarly executed in the case where the self PC has the server function for managing the licenses as well as the foregoing embodiment. Explanation will now be made together with such an example.

Figure 11:
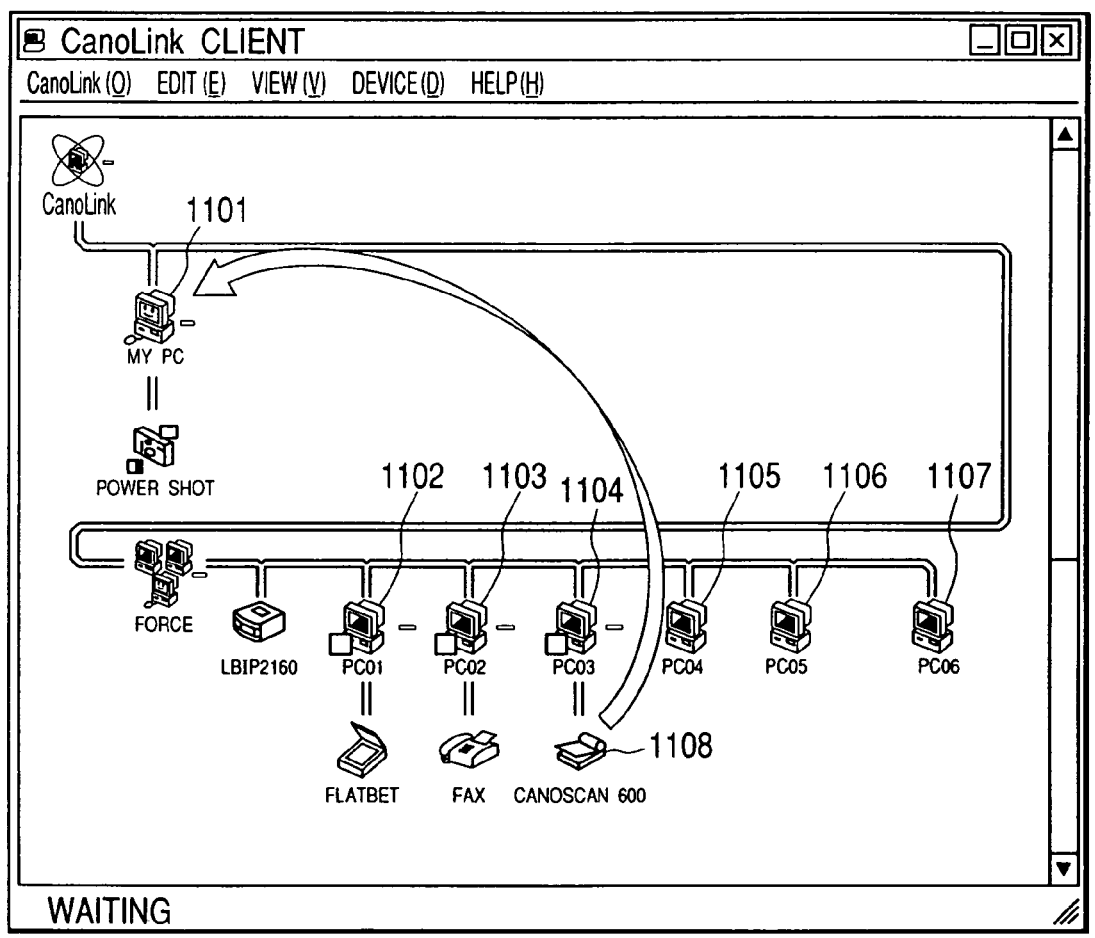
FIG. 11 is a diagram showing an example of a virtual system construction display screen of a network system which is displayed on the CRT shown in FIG. 2 and constructed by various PCs and various peripheral devices in the fourth embodiment.

FIG. 11 is a diagram showing an example of a virtual system construction display screen of a network system which is displayed on the CRT 16 shown in FIG. 2 and constructed by various PCs and various peripheral devices in the fourth embodiment.

In FIG. 11, an icon 1101 denotes a self PC and indicates a PC having a server function for managing the number of valid licenses (PC having the server function for managing the licenses). Each of icons 1102, 1103, and 1104 denotes an icon showing the licensed client PC of the license management server PC which is used by the self PC. A group is formed by those four PCs including the self PC. Further, each of icons 1105, 1106, and 1107 denotes an icon indicative of the ordinary PC. An icon 1108 indicates a scanner shared by the PC 1104.

An arrow shown in FIG. 11 means a process in the case where the scanner is dragged and dropped to the server icon of the self PC. By this processing operation, a transferring process of scanner data is performed to the server for managing the licenses (server constructing the group). Although the transfer data (distribution data) uses the data read out by the scanner as a source, a file can be also simply dropped. The kind of data is not particularly limited. Although a drag & drop process has been used here as an instructing method (distribution destination designating means), the distribution destination can be also instructed from a menu or a copy & paste process or the like can be also used. It is assumed that the invention is not particularly limited to those methods so long as the source and destination can be clearly instructed.

When the processing operation (data transfer processing operation) is executed, data is first automatically obtained from the scanner. After that, the list of the licensed client PCs held in the license management server shown in FIG. 7 is obtained and each of the client PCs is designated as a destination. A process for transferring the obtained data to the destination is executed. In this case, the data is derived from the scanner 1108 and the data is transferred to the server PC of the self PC shown by the icon PC 1101 and to each of the client PCs shown by the icons 1102, 1103, and 1104. An existing method can be used as a data transfer method and the invention is not particularly limited to it.

The operation to perform the distributing process of the transfer data in a lump to the set group of the PCs will now be described with reference to a flowchart of FIG. 12. FIG. 12 is the flowchart showing the control operation of a program for performing the distributing process of the transfer data in a lump.

As for this program, the program stored in the HDD 10 or FD 9 shown in FIG. 2 or in another storage medium (not shown) is read out and stored in the PMEM 3 and the CPU 2 executes the program on the basis of the read-out program.

First, whether a data transfer processing request has been issued to the license management server PC (in this case, the self PC 1101) to which the self PC belongs or not, namely, whether there is a data transfer request for the group or not is discriminated (step 1201). If it is determined in step 1201 that there is the data transfer request, step 1202 follows and the obtaining of the designated data is started.

After completion of the obtaining of the designated data, the list (FIG. 7) of the licensed client PCs which are managed by the license management server PC as a data addressee is obtained (step 1203). In step 1204, this list is referred to and each of the registered client PCs is automatically designated as an addressee (destination). Further, in step 1205, the data is automatically transferred in a lump or sequentially to the license management server PC and the client PCs.

By the above processes, when the user instructs the data transfer to the license management server PC to which the self PC belongs and the group constructed by the licensed client PCs, the data to be transferred is merely instructed to the license management server, thereby enabling the data to be transferred without newly designating the destination and enabling the data to be easily transferred to the group. In the case where the network construction displayed on the virtual system construction display screen on the CRT 16 is displayed in a state where the component PCs of the group can be easily visually grasped as shown in the foregoing third embodiment, the user can easily visually perform the processing operation (drag & drop operation or the like).

According to the invention as described above, in the icon display which could not show the various functions possessed by each PC when the PCs are displayed so far, by displaying the PC having the server function by using the icon indicative of the function of such a PC, the user can visually grasp the PC having the server function.

Particularly, the PC having the server function for managing the number of valid licenses is displayed by another different icon and when the licensed client PCs are displayed, the server regarding the license and the client PCs are set to one group and a visual icon display is provided, thereby enabling a process of the license management to be reduced.

Further, by performing the data transferring process by using the visual group display, when desired data is transferred to the group, the user can transfer the data to the group by the simple operation without particularly (newly) designating the destination.

Although the case where the program for making the information processing apparatus of the invention operative is held in the ROM has been described in the foregoing embodiments, the invention is not limited to such a case but the program can be also realized by using an arbitrary storage medium. Further, it can be also realized by a circuit which can perform a similar operation.

The invention can be applied to a system comprising a plurality of apparatuses or an apparatus comprising one device. The invention also incorporates a case where in order to make the various kinds of devices operative in order to realize the functions of the embodiments mentioned above, program codes of software to realize the functions of the foregoing embodiments are supplied to a computer in an apparatus or a system connected to the various devices, and the various devices are made operative in accordance with a program stored in a computer (a CPU or an MPU) of the system or apparatus, thereby embodying the above functions.

In this case, the program codes themselves of the software realize the functions of the embodiments mentioned above. The program codes themselves and means for supplying the program codes to the computer, for example, the recording medium in which the program codes have been stored construct the invention. As a recording medium for storing the program codes, for example, it is possible to use a floppy disk, a hard disk, an optical disk, a magnetooptic disk, a CD-ROM, a magnetic tape, a non-volatile memory card, an ROM, or the like can be used.

The program codes are also incorporated in the embodiment in not only a case where the functions of the embodiments mentioned above are realized by executing the supplied program codes by the computer but also a case where the functions of the embodiments mentioned above are realized by a method whereby the program codes function in cooperation with the OS (Operating System) which operates in the computer, another application software, or the like.

Further, the invention also incorporates a case where the supplied program codes are stored in a memory equipped for a function expanding board of a computer or a function expanding unit connected to the computer and, thereafter, a CPU or the like equipped for the function expanding board or function expanding unit executes a part or all of the actual processes on the basis of instructions of the program codes, and the functions of the embodiments mentioned above are realized by those processes.

The shape of structure of each section shown in the embodiments are merely shown as examples for embodying the invention and the technical scope of the present invention should not be limitedly interpreted by them. That is, many modifications and variations of the present invention are possible within the spirit and main features of the invention.

According to the invention as described above, the character information of the information processing device having the server function for managing the licenses among the information processing devices having the server function and the information processing devices having the shared server function is displayed by the character information of the shape different from that of the ordinary information processing device. Therefore, the user can easily visually identify the information processing device having the server function and, further, the information processing device having the server function for managing the licenses.

Since the group client constructed by the information processing devices having the server function for managing each license and the information processing devices on the licensed client side is clarified, the information processing devices having the server function for managing the licenses forming the group to which the self PC belongs and the information processing device on the client side can be easily visually discriminated.

Further, when the distributing process is performed to the set group, merely by dropping the desired distribution data onto the character information of the information processing devices having the server function for managing the licenses, the data can be distributed to the whole group without particularly executing the process such as destination designation or the like.

What is claimed is:

1. A data processing apparatus that communicates data through a network to each of a plurality of computers and a plurality of peripheral devices connected to the network, comprising: display means for displaying the plurality of computers and the plurality of peripheral devices as symbol information, respectively, on a display screen; first discriminating means for discriminating, from the plurality of computers, at least one computer that has a server function; second discriminating means for discriminating, from the at least one computer that has the server function discriminated by said first discriminating means, at least one computer that has a license server function; third discriminating means for discriminating, from the at least one computer that has the license server function discriminated by said second discriminating means, a license management server computer that is used by said data processing apparatus and has a license server function for issuing a predetermined license to said data processing apparatus; and first control means for controlling said display means to display as a visual symbol the license management server computer discriminated by said third discriminating means such that the license management server computer is distinguished from computers that are not discriminated by said third discriminating means; fourth discriminating means for discriminating, from the plurality of computers, a server device having an image input server function which may be used by said data processing apparatus; second control means for controlling the server device discriminated by said fourth discriminating means such that the server device may be identified from other devices on the display screen; selecting means for selecting a symbol on the display screen; and service supplying means for supplying a common service to each of a plurality of licensee computers to which the predetermined license has been issued from the license management server computer, when the license management server computer and the server device have been selected by said selecting means.

2. An apparatus according to claim 1, wherein the common service which is supplied by said service supplying means includes a distribution service for distributing a same data to each of the licensee computers.

3. A data processing apparatus that communicates data through a network to each of a plurality of computers and a plurality of peripheral devices connected to the network, comprising: display means for displaying the plurality of computers and the plurality of peripheral devices, respectively, on a display screen; first discriminating means for discriminating, from the plurality of computers, at least one computer that has a server function; second discriminating means for discriminating, from the at least one computer that has the server function discriminated by said first discriminating means, at least one computer that has a license server function; third discriminating means for discriminating, from the at least one computer that has the license server function discriminated by said second discriminating means, a license management server computer that is used by said data processing apparatus and has a license server function for issuing a license to at least said data processing apparatus; and first control means for controlling said display means to display as a visual symbol the license management server computer discriminated by said third discriminating means such that the license management server computer is distinguished from computers that are not discriminated by said third discriminating means; fourth discriminating means for discriminating, from the plurality of computers, a server device having an image input server function which may be used by said data processing apparatus; second control means for controlling the server device discriminated by said fourth discriminating means such that the server device may be identified from other devices on the display screen; selecting means for selecting a symbol on the display screen; and service supplying means for supplying a common service to each of a plurality of licensee computers to which the license has been issued from the license management server computer, when the license management server computer and the server device have been selected by said selecting means.

4. An apparatus according to claim 3, wherein the common service which is supplied by said service supplying means includes a distribution service for distributing a same data to each of the licensee computers.

5. A data processing method in a data processing apparatus that communicates data through a network to each of a plurality of computers and a plurality of peripheral devices connected to the network, comprising: a display step of displaying the plurality of computers and the plurality of peripheral devices as symbol information, respectively, on a display screen; a first discriminating step of discriminating, from the plurality of computers, at least one computer that has a server function; a second discriminating step of discriminating, from the at least one computer that has the server function discriminated by said first discrimination step, at least one computer that has a license server function; a third discriminating step of discriminating, from the at least one computer that has the license server function discriminated by the second discriminating step, a license management server computer that is used by said data processing apparatus and has a license server function for issuing a predetermined license to at least the data processing apparatus; and a first control step of controlling the display step to display as a visual symbol the license management server computer discriminated in said third discriminating step such that the license management server computer is distinguished from computers that are not discriminated by said third discriminating step; a fourth discriminating step of discriminating, from the plurality of computers, a server device having an image input server function which may be used by the data processing apparatus; a second control step of controlling the server device discriminated in said fourth discriminating step such that the server device may be identified from other devices on the display screen; a selecting step of selecting a symbol on the display screen; and a service supplying step of supplying a common service to each of a plurality of licensee computers to which the predetermined license has been issued from the license management server computer, when the license management server computer and the server device have been selected in said selecting step.

6. A method according to claim 5, wherein the common service which is supplied in said service supplying step includes a distribution service for distributing a same data to each of the licensee computers.

7. A data processing method in a data processing apparatus that communicates data through a network to each of a plurality of computers and a plurality of peripheral devices connected to the network, comprising: a display step of displaying the plurality of computers and the plurality of peripheral devices, respectively, on a display screen; a first discriminating step of discriminating, from the plurality of computers, at least one computer that has a server function; a second discriminating step of discriminating, from the at least one computer that has the server function discriminated by said first discrimination step, at least one computer that has a license server function; a third discriminating step of discriminating, from the at least one computer that has the license server function discriminated by the second discriminating step, a license management server computer that is used by said data processing apparatus and has a license server function for issuing a license to at least the data processing apparatus; and a first control step of controlling said display step to display as a visual symbol the license management server computer discriminated in said third discriminating step such that the license management server computer is distinguished from computers that are not discriminated by said third discriminating step; a fourth discriminating step of discriminating, from the plurality of computers, a server device having an image input server function which may be used by the data processing apparatus; a second control step of controlling the server device discriminated in said fourth discriminating step such that the server device may be identified from other devices on the display screen; a selecting step of selecting a symbol on the display screen; and a service supplying step of supplying a common service to each of a plurality of licensee computers to which the license has been issued from the license management server computer, when the license management server computer and the server device have been selected in said selecting step.

8. A method according to claim 7, wherein the common service which is supplied in said service supplying step includes a distribution service for distributing a same data to each of the licensee computers.

9. A computer-readable storage medium storing a computer program which is executed by a computer of a data processing apparatus that communicates data through a network to each of a plurality of computers and a plurality of peripheral devices connected to the network, wherein the computer program implements a data processing method of the data processing apparatus, the method comprising: a display step of displaying the plurality of computers and the plurality of peripheral devices as symbol information, respectively, on a display screen; a first discriminating step of discriminating, from the plurality of computers, at least one computer that has a server function; a second discriminating step of discriminating, from the at least one computer that has the server function discriminated by said first discrimination step, at least one computer that has a license server function; a third discriminating step of discriminating, from the at least one computer that has the license server function discriminated by the second discriminating step, a license management server computer that is used by said data processing apparatus and has a license server function for issuing a predetermined license to at least the data processing apparatus; and a first control step of controlling said display step to display as a visual symbol the license management server computer discriminated in said third discriminating step such that the license management server computer is distinguished from computers that are not discriminated by said third discriminating step; a fourth discriminating step of discriminating, from the plurality of computers, a server device having an image input server function which may be used by the data processing apparatus; a second control step of controlling the server device discriminated in said fourth discriminating step such that the server device may be identified from other devices on the display screen; a selecting step of selecting a symbol on the display screen; and a service supplying step of supplying a common service to each of a plurality of licensee computers to which the predetermined license has been issued from the license management server computer, when the license management server computer and the server device have been selected in said selecting step.

10. A medium according to claim 9, wherein the common service which is supplied in said service supplying step includes a distribution service for distributing a same data to each of the licensee computers.

11. A computer-readable storage medium storing a computer program which is executed by a computer of a data processing apparatus that communicates data through a network to each of a plurality of computers and a plurality of peripheral devices connected to the network, wherein the computer program implements a data processing method of the data processing apparatus, the method comprising: a display step of displaying the plurality of computers and the plurality of peripheral devices, respectively, on a display screen; a first discriminating step of discriminating, from the plurality of computers, at least on computer that has a server function; a second discriminating step of discriminating, from the at least one computer that has the server function discriminated by said first discrimination step, at least one computer that has a license server function; a third discriminating step of discriminating, from the at least one computer that has the license server function discriminated by the second discriminating step, a license management server computer that is used by said data processing apparatus and has a license server function for issuing a license to at least the data processing apparatus; and a first control step of controlling said display step to display as a visual symbol the license management server computer discriminated in said third discriminating step such that the license management server computer is distinguished from computers that are not discriminated by said third discriminating step; a fourth discriminating step of discriminating, from the plurality of computers, a server device having an image input server function which may be used by the data processing apparatus; a second control step of controlling the server device discriminated in said fourth discriminating step such that the server device may be identified from other devices on the display screen; a selecting step of selecting a symbol on the display screen; and a service supplying step of supplying a common service to each of a plurality of licensee computers to which the license has been issued from the license management server computer, when the license management server computer and the server device have been selected in said selecting step.

12. A medium according to claim 11, wherein the common service which is supplied in said service supplying step includes a distribution service for distributing a same data to each of the licensee computers.

* * * * *

UNITED STATES PATENT AND TRADEMARK OFFICE
CERTIFICATE OF CORRECTION

PATENT NO. : 7,231,438 B1  
APPLICATION NO. : 09/675002  
DATED : June 12, 2007  
INVENTOR(S) : Kikuchi Page 1 of 1

It is certified that error appears in the above-identified patent and that said Letters Patent is hereby corrected as shown below:

COLUMN 4:
Line 44, "in case" should read -- in the case --.

COLUMN 13:
Line 60, "can be used" should be deleted.

COLUMN 18:
Line 13, "at least on" should read -- at least one --.

Signed and Sealed this

Twenty-seventh Day of May, 2008

JON W. DUDAS  
*Director of the United States Patent and Trademark Office*